United States Patent Office 3,534,139
Patented Oct. 13, 1970

3,534,139
17α - ETHYNYL - 8α - H - Δ$^{5(10)}$ - ESTRENE - 17β - OL-3-ONE, PROCESS OF PREPARATION, THERAPEUTIC ADMINISTRATION AND INTERMEDIATES
Robert Bucourt, Clichy-sous-Bois, and Jean-Claude Gasc, Bondy, France, assignors to Roussel-UCLAF, Paris, France, a corporation of France
No Drawing. Filed Mar. 7, 1966, Ser. No. 532,072
Claims priority, application France, Mar. 16, 1965, 9,430; May 4, 1965, 15,711
Int. Cl. C07c 169/08
U.S. Cl. 424—243     3 Claims

ABSTRACT OF THE DISCLOSURE

This invention relates to 17α-ethynyl-8α-H-Δ$^{5(10)}$-estrene-17β-ol-3-one in its racemic and optically active forms. This compound possesses a hypophysial inhibitory activity, an anti-fertilizing action, an anti-nidatory effect as well as an anti-ovulatory effect.

---

The present invention relates to new derivatives of the estrane series as well as to the process for the preparation of these compounds. In particular, the invention relates to 17α-ethynyl-8α-H-Δ$^{5(10)}$-estrene-17β-ol-3-one in its racemic and optically active forms.

The compounds of the invention present useful pharmacological properties. Particularly they possess a hypophysial inhibitory activity curbing the F.S.H. secretion (folliculo-stimulating hormone), which is very distinctly superior to that of 17α-ethynyl-Δ$^{5(10)}$-estrene-17β-ol-3-one (norethynodrel), an isomer in natural form.

Furthermore, the compounds possess an antifertilizing action by interfering in the mechanism of reproduction. At the same time, 17α-ethynyl-8α-H-Δ$^{5(10)}$-estrene-17β-ol-3-one possesses a very pronounced action on the implantation of ova (anti-nidatory effect) as well as an anti-ovulatory action. These effects are always superior to those obtained with norethynodrel.

It is surprising to find that 17α-ethynyl-8α-H-Δ$^{5(10)}$-estrene-17β-ol-3-one is more active than the compound in the natural form (8β-H isomer). In fact, the contrary has been established for the known 8-iso compounds, such as, for example, 8-iso-testosterone, 8-iso-estrone, 8-iso-19-nor-testosterone or 8-iso-progesterone.

Thus, it has been proven that the isomerization of the 8-center diminishes by more than one-half the virilizing effects of testosterone. In the same way, the androgenic effect of 8-iso-19-nor-testosterone is much weaker than that of its isomer in the natural series, and the anabolic effect disappears almost entirely.

The increase in the hypophysial inhibitory activity curbing the F.S.H. secretion and the increase in antifertilizing action with regard to the compound of normal structure, norethynodrel (notwithstanding the isomerization of 8-center), consequently, constitute an unexpected and non-evident phenomenon.

An object of this invention is the obtention of a compound selected from the group consisting of the racemic and optically active forms of 17α-ethynyl-8α-H-Δ$^{5(10)}$-estrene-17β-ol-3-one.

Another object of this invention is the development of a method of curbing recessive hypophysial activity in warm-blooded animals which comprises administering to said warm-blooded animals from about 0.04 mg./kg. to about 6.0 mg./kg. per day, based on the body weight of said warm-blooded animals, of 17α-ethynyl-8α-H-Δ$^{5(10)}$-estrene-17β-ol-3-one.

A further object of this invention is the development of a method of suppressing ovulation in warm-blooded animals which comprises administering to said warm-blooded animals from about 0.04 mg./kg. to about 6.0 mg./kg. per day, based on the body weight of said warm-blooded animals, of 17α-ethynyl-8α-H-Δ$^{5(10)}$-estrene-17β-ol-3-one.

A yet further object of this invention is the development of a method of suppressing fertilization of the ova in warm-blooded animals which comprises administering to said warm-blooded animals from about 0.04 mg./kg. to about 10.0 mg./kg. per day, based on the body weight of said warm-blooded animals, of 17α-ethynyl-8α-H-Δ$^{5(10)}$-estrene-17β-ol-3-one.

A still further object of this invention is the development of a process for the production of a compound selected from the group consisting of the racemic and optically active forms of 17α-ethynyl-8α-Δ$^{5(10)}$-estrene-17β-ol-3-one, which comprises the steps of (a) subjecting 8α-H-Δ$^{5(10)}$-estrene-17β-ol-3-one to the action of a ketalizing agent under ketalizing conditions, (b) reacting the resulting 3-ketal-8α-H-Δ$^{5(10)}$-estrene-17β-ol with an oxidizing agent effecting oxidization of the hydroxyl group, (c) ethynylating the resulting 3-ketal-8α-H-Δ$^{5(10)}$-estrene-17-one by means of an ethynylating agent, (d) hydrolyzing the resulting 3-ketal-17α-ethynyl-8α-H-Δ$^{5(10)}$-estrene-17β-ol by the action of an acid and (e) recovering said 8α-H-17α-ethynyl-Δ$^{5(10)}$-estrene-17β-ol-3-one.

These and other objects of the invention will become more apparent as the description thereof proceeds.

The process for the preparation of racemic and optically active 17α-ethynyl-8α-H-Δ$^{5(10)}$-estrene-17β-ol-3-one, a further object of the invention, is characterized in that 8α-H-Δ$^{5(10)}$-estrene-17β-ol-3-one is subjected to the action of a ketalizing agent, and the formed 3-ketal-8α-H-Δ$^{5(10)}$-estrene-17β-ol is reacted with an oxidizing agent, thus obtaining the corresponding 17-ketonic compound, which by the action of an ethynylating reactant, followed by acid hydrolysis, supplies the desired 17α-ethynyl-8α-H-Δ$^{5(10)}$-estrene-17β-ol-3-one.

Advantageously, the process of the invention is conducted as follows:

(1) The 3-ketone of 8α-H-Δ$^{5(10)}$-estrene-17β-ol-3-one may be protected in the form of either an ethylene ketal or a dimethyl ketal.

(2) The oxidation of the ketalized product may be effected by the action of chromic anhydride in pyridine or by the Oppenauer method.

(3) In order to ethynylate the oxidized product, an alkali metal acetylide may be utilized, prepared by starting with an alkali metal alkanolate and acetylene, such as potassium acetylide obtained by starting with potassium tert.-amylate. Likewise, a magnesium ethynyl halide may be used, such as the iodide, bromide or chloride while working in an organic solvent.

(4) The acid hydrolysis of the ethynylation product may be effected by action of a dilute acid such as aqueous acetic acid.

The following examples will serve for a better comprehension of the invention, but it is to be understood, however, that they do not limit the invention in any manner.

EXAMPLE I

Preparation of 17α-ethynyl-8α-H-Δ$^{5(10)}$-estrene-17β-ol-3-one

Step A: Preparation of 3-ethylenedioxy-8α-H-Δ$^{5(10)}$-estrene-17β-ol.—Under an atmosphere of nitrogen, 3.64 gm. of 8α-H-Δ$^{5(10)}$-estrene-17β-ol-3-one were introduced into 36 cc. of anhydrous benzene. Next, 55 cc. of technical methyl ethyl dioxolane, containing less than 2% of ethylene-glycol, and 0.11 gm. of p-toluene sulfonic acid were added, and the mixture was agitated overnight at room temperature. Thereafter, the reaction mixture was poured into water containing sodium bicarbonate and extracted with methylene chloride.

The extracts obtained were washed with water, dried and evaporated to dryness under vacuum. The residue was iced and then crystallized from an isopropyl ether-cyclohexane mixture.

3.175 gm. of 3-ethylenedioxy-8α-H-Δ$^{5(10)}$-estrene-17β-ol were obtained, having a melting point of 115° C. and a specific rotation $[\alpha]_D^{20}=0°$ (c.=0.5% in dioxane).

This product occurred in the form of colorless crystals, insoluble in dilute aqueous acids and alkalis, and soluble in most of the usual organic solvents.

*Analysis.*—$C_{20}H_{30}O_3$; molecular weight=318.44. Calculated (percent): C, 75.43; H, 9.49. Found (percent): C, 75.3; H, 9.5.

As far as the applicants know, this compound is not described in the literature.

The starting substance, namely, 8α-HΔ$^{5(10)}$-estrene-17β-ol-3-one, can be prepared according to the process described in French Pat. No. 1,404,413.

Step B: Preparation of 3-ethylenedioxy-8α-H-Δ$^{5(10)}$-estrene-17-one.—1.5 gm. of chromic anhydride were introduced into 15 c. of pyridine cooled to about 0° C. The solution was agitated for 15 minutes, then 1.5 gm. of 3-ethylenedioxy-8α-H-Δ$^{5(10)}$-estrene-17β-ol dissolved in 15 cc. of pyridine were added and the agitation was continued overnight at room temperature.

Thereafter, the reaction mixture was poured into 60 cc. of methanol, agitated for ½ hour, then 60 cc. of methylene chloride were added. The reaction mixture was filtered and the filtrate was washed with water. After the organic phase had been dried, it was purified by passing it over magnesium silicate and finally evaporated to dryness under vacuum.

In this way, 1.34 gm. of 3-ethylenedioxy-8α-H-Δ$^{5(10)}$-estrene-17-one was obtained, having a melting point of 148° C. and a specific rotation $[\alpha]_D^{20}=+61.4°$ (c.=0.5% in dioxane).

The product occurred in the form of small colorless rods, insoluble in dilute aqueous alkalis and acids, and soluble in most of the commonly known organic solvents.

*Analysis.*—$C_{20}H_{28}O_3$; molecular weight=316.42. Calculated (percent): C, 75.91; H, 8.92. Found (percent): C, 75.8; H, 8.9.

As far as the applicants know, this compound is not described in the literature.

The oxidation of 3-ethylenedioxy-8α-H-Δ$^{5(10)}$-estrene-17β-ol may also be performed according to the Oppenauer method. The work was carried out in the following manner:

1.5 gm. of product were introduced into a mixture of 25 cc. of cyclohexanone and 200 cc. of anhydrous toluene. The solution was heated to boiling point. Then within the space of 2½ hours, 1.30 gm. of aluminum isopropylate in 120 cc. of toluene were added thereto. The solution was heated at reflux for ½ hour longer while distilling 120 cc. of solvent therefrom. The solution was then cooled. Next, 4.5 gm. of potassium carbonate and 9 gm. of sodium potassium tartrate in 90 cc. of water were added, and the mixture thus formed was subjected to steam distillation for 2 hours. After the mixture was cooled, it was extracted with ether. The extracts were washed with water and evaporated to dryness under vacuum. The residue was subjected to chromatography through silica gel with elution with methylene chloride. 3-ethylenedioxy-8α-H-Δ$^{5(10)}$-estrene-17-one was obtained, having a melting point of 148° C., identical to the product described in the preceding step.

Step C: Preparation of 3-ethylenedioxy-17α-ethynyl-8α-H-Δ$^{5(10)}$-estrene-17β-ol.—Under an atmosphere of nitrogen, 6 gm. of potassium in small pieces were introduced into 60 cc. of tert.-amyl alcohol and 60 cc. of anhydrous benzene, and the suspension was agitated for 1 hour at about 60° C. A stream of acetylene was substituted for the atmosphere of nitrogen, which stream was allowed to bubble through the suspension for 1½ hour.

Next, the suspension was cooled to room temperature; then 1.22 gm. of 3-ethylenedioxy-8α-H-Δ$^{5(10)}$-estrene-17-one dissolved in 38 cc. of tetrahydrofuran and 24 cc. of benzene were added. The solution was agitated for 2 hours 15 minutes, while the stream of acetylene continued to bubble through the solution. Thereafter, the reaction mixture was poured into water. The organic phase was decanted, dried and evaporated to dryness under vacuum.

The residue obtained was crystallized from isopropyl ether. After initiation of crystallization by scratching, .125 gm. of 3-ethylenedioxy-17α-ethynyl-8α-H-Δ$^{5(10)}$-estrene-17β-ol were obtained, which product was used as such for the next step in the synthesis.

As far as the applicants know, this compound is not described in the literature.

The ethynylation of 3 - ethylenedioxy - 8α-H-Δ$^{5(10)}$-estrene-17-one may also be accomplished by means of ethynyl magnesium halide. The work was carried out in the following manner:

A stream of methyl bromide was allowed to bubble through a suspension of 12.5 gm. of magnesium in 200 cc. of anhydrous ether under reflux. 270 cc. of tetrahydrofuran were added to 120 cc. of the magnesium solution obtained and acetylene was allowed to bubble through the solution for 3 hours.

In this manner an ethynyl magnesium bromide solution was obtained, into which 1.26 gm. of 3-ethylene-dioxy-8α-H-Δ$^{5(10)}$-estrene-17-one dissolved in 40 cc. of tetrahydrofuran were introduced. The stream of acetylene was maintained and the solution was heated for 2 hours under reflux. Thereafter, the solution was cooled, 150 cc. of a saturated solution of ammonium chloride were added; then the mixture was poured into water and extracted with ether.

The evaporation of the ethereal solution yielded a residue which was crystallized from isopropyl ether to obtain 3 - ethylenedioxy - 17α-ethynyl-8α-H-Δ$^{5(10)}$-estrene-17β-ol, which product was used without further purification for the next step of the synthesis.

Step D: Preparation of 17α-ethynyl-8α-H-Δ$^{5(10)}$-estrene-17β-ol-3-one.—1.25 gm. of 3-ethylenedioxy-17α-ethynyl-8α-H-Δ$^{5(10)}$-estrene-17β-ol were introduced into 50 cc. of acetic acid containing 25% of water and the solution was agitated for 5 hours at room temperature. Thereafter, the reaction mixture was poured into a mixture of water, ice and sodium bicarbonate and agitated for one hour.

The reaction mixture was next vacuum filtered. The crystals were washed with water until the wash waters were neutral and then dried, thus obtaining 920 mg. of crystallized product.

Starting from the motor liquors which were extracted with methylene chloride, 155 mg. more of the same product were recovered.

After subjecting the product obtained to chromatography through magnesium silicate with elution with methylene chloride containing 0.5% of acetone, the eluate was crystallized from cold cyclohexane, thus obtaining 510 mg. of 17α-ethynyl-8α-H-Δ$^{5(10)}$-estrene-17β-ol-3-one, having a melting point of 130° C. and a specific rotation $[\alpha]_D^{20}=-47.5°$ (c.=0.5% in dioxane).

The product occurred in the form of colorless needles, insoluble in water, in dilute aqueous acids and alkalis, slightly soluble in benzene, and soluble in alcohol, ether, acetone and chloroform.

*Analysis.*—$C_{20}H_{26}O_2$; molecular weight=298.41. Calculated (percent): C, 80.49; H, 8.78. Found (percent): C, 80.6; H, 8.8.

As far as the applicants know, this compound is not described in the literature.

EXAMPLE II

Preparation of racemic 17α-ethynyl-8α-H-Δ$^{5(10)}$-estrene-17β-ol-3-one

Step A: Preparation of racemic 3-ethylenedioxy-8α-H-Δ$^{5(10)}$-estrene-17β-ol.—3.64 gm. of racemic 8α-H-Δ$^{5(10)}$-estrene-17β-ol-3-one were dissolved in a solution of 0.110 gm. of p-toluene sulfonic acid, 36 cc. of benzene and 55 cc. of methyl ethyl dioxolane. After being agitated overnight under an atmosphere of nitrogen at a temperature of 20 to 25° C., the reaction mixture was poured into a sodium bicarbonate solution. The organic phase was extracted with methylene chloride, then the organic phases were combined, washed with water until the wash waters were neutral, dried over potassium carbonate and evaporated to dryness, 4.800 gm. of raw product were thus obtained. The product obtained was purified by crystallization from a mixture of isopropyl ether and cyclohexane (1:1). The solution obtained was cooled for 1 hour at 5° C. Thereafter, the crystals were filtered and vacuum filtered, washed with the iced isopropyl ether-cyclohexane mixture and dried under vacuum. 3.175 gm. of product were recovered. By concentration of the mother liquors, a second yield of 0.400 gm. was obtained. The overall yield amounted to 84%. For analysis, the product was purified by recrystallization from the isopropyl ether-cyclohexane mixture (1:1). In this way, racemic 3-ethylenedioxy-8α-H-Δ$^{5(10)}$-estrene-17β-ol was obtained in the form of a colorless crystallized product, insoluble in water and slightly soluble in isopropyl ether. The compound has a melting point of 126° C. to 127° C.

As far as the applicants know, this product is not described in the literature.

The starting product, namely, racemic 8α-H-Δ$^{5(10)}$-estrene-17β-ol-3-one, was obtained according to the process described in French Pat. No. 1,404,413.

Step B: Preparation of racemic 3-ethylenedioxy-8α-H-Δ$^{5(10)}$-estrene-17-one.—1.5 gm. of chromic anhydride were introduced into 15 cc. of pyridine at a temperature of 0° to +5° C., and the solution was agitated for 15 minutes at 5° C. to 10° C. Then a solution of 1.5 gm. of racemic 3-ethylenedioxy-8α-H-Δ$^{5(10)}$-estrene-17β-ol were added to the pyridine solution while maintaining the temperature at about 0° C. The reaction mixture was agitated overnight at room temperature. Next, 60 cc. of methanol were added to the reaction mixture which was then agitated for 30 minutes; finally 60 cc. of methylene chloride were added thereto. The insoluble mineral matter was filtered off. The filtrate was washed with water and dried over potassium carbonate. The solution was passed through a column of magnesium silicate, then evaporated to dryness. 1.340 gm. of 3-ethylenedioxy-8α-H-Δ$^{5(10)}$-estrene-17-one were recovered, which product was purified by trituration with isopropyl ether at reflux and icing. Thus, 1.200 gm. of pure product were recovered, having a melting point of 142 to 143° C. On recrystallization from ethanol, by heating and cooling, 0.636 gm. of racemic 3-ethylenedioxy-8α-H-Δ$^{5(10)}$-estrene-17-one were obtained in the form of a colorless crystallized product, which was insoluble in water and in dilute aqueous alkalis, slightly soluble in ethyl acetate, isopropyl ether and alcohols, and having a melting point of 143 to 144° C.

To the best knowledge of the applicants, this product is not described in the literature.

Analysis.—$C_{20}H_{28}O_3$; molecular weight=316.42. Calculated (percent): C, 75.91; H, 8.92. Found (percent): C, 75.9; H, 8.8.

Step C: Preparation of racemic 3-ethylenedioxy-17α-ethynyl-8α-H-Δ$^{5(10)}$-estrene - 17β - ol.—Under an atmosphere of nitrogen, 145 cc. of tert.-amyl alcohol, 145 cc. of benzene and 14 gm. of potassium were admixed. The mixture was kept under agitation for one hour at a temperature of 55° to 60° C. Then a stream of acetylene was allowed to bubble through the mixture for a period of 1½ hours. The reaction mixture was returned to room temperature and a solution of 2.9 gm. of racemic 3-ethylenedioxy-8α-H-Δ$^{5(10)}$-estrene-17-one in 90 cc. of tetrahydrofuran and 58 cc. of benzene was added thereto. The ambient temperature was maintained, under an atmosphere of acetylene, for 2¼ hours. Thereafter, the excess acetylene was eliminated by a stream of nitrogen. Next, the reaction mixture was agitated for 15 minutes. Then 85 cc. of water were added without exceeding a temperature of 30° C. The organic phase was decanted, washed with water until the wash waters were neutral, then dried over sodium sulfate and evaporated to dryness under vacuum. Thus, 3.14 gm. of raw product were obtained. The raw product was triturated, at reflux, in 20 cc. of isopropyl ether and kept under refrigeration overnight. 2.39 gm. of racemic 3-ethylenedioxy-17α-ethynyl-8α-H-Δ$^{5(10)}$-estrene-17β-ol were recovered, having a melting point of 165 to 166° C.

As far as the applicants know, this product is not described in the literature.

Step D: Preparation of racemic 17α-ethynyl-8α-H-Δ$^{5(10)}$-estrene-17β-ol-3-one.—2.39 gm. of racemic 3-ethylenedioxy-17α-ethynyl-8α-H-Δ$^{5(10)}$-estrene - 17β - ol were introduced into 96 cc. of acetic acid containing 25% of water. The solution was agitated at room temperature for 5 hours. Thereafter, under continued agitation, the reaction mixture was poured into an aqueous solution of sodium bicarbonate and agitated for one hour. The precipitate formed was filtered, then vacuum filtered, washed with water until the wash waters were neutral and finally dried under vacuum. 1.922 gm. of product were thus obtained, having a melting point of 192° C. The product was then purified by subjecting it to chromatography through magnesium silicate and elution first with methylene chloride, then with methylene chloride containing 1% of acetone. The purified product was redissolved in acetone under reflux and concentrated. On icing overnight, 2.75 gm. of racemic 17α-ethynyl-8α-H-Δ$^{5(10)}$-estrene-17β-ol-3-one were obtained, being a total yield of 62%, having a melting point of 198° C.

The product obtained was insoluble in water, in dilute aqueous acids and alkalis, and slightly soluble in isopropyl ether and acetone.

Analysis.—$C_{20}H_{26}O_2$; molecular weight=298.41. Calculated (percent): C, 80.49; H, 8.78. Found (percent): C, 80.2; H, 8.8.

To the best knowledge of the applicants, this product is not described in the literature.

As it has been indicated in the preceding, 17α-ethynyl-8α-H-Δ$^{5(10)}$-estrene-17β-ol-3-one, in its racemic and optically active forms, is endowed with interesting pharmacological properties. In particular, it possesses a curbing action on the hypophysis. The compound may be utilized for the treatment of excessive amounts in the hypophysis of the F.S.H. factor (folliculo-gonadotropic stimulating hormone), due to castration or menopause and, in general fashion, in all those cases where a curbing of the hypophysial gonadotrophines is desirable.

Furthermore, the product possesses in warm-blooded animals an antifertilizing action by intervening in the mechanism of reproduction. It has a very distinct antinidatory effect as well as an anti-ovulatory effect.

17α-ethynyl-8α-H-Δ$^{5(10)}$-estrene-17β-ol - 3 - one may be utilized orally, perlingually, transcutaneously or rectally. The product can be prepared in the form of injectable solutions or suspensions, prepared in ampules and in multiple-dose flacons; in implants, in tablets, coated tablets, sublingual tablets and suppositories.

The useful dosology for warm-blooded animals is controlled between 0.04 mg./kg. to 10.0 mg./kg. per day, or preferably between 2 and 30 mg. per day for the adult as a function of the method of administration.

The pharmaceutical forms such as injectable solutions or suspensions, implants, tablets, coated tablets, sublingual tablets and suppositories are prepared according to the usual processes.

EXAMPLE III

Pharmacological study of 17α-ethynyl-8α-H-π$^{5(10)}$-estrene-17β-ol-3-one (1) Determination of the hypophysial inhibitory effect: Many couples of female rats, each couple being sisters of the same litter, aged 30 days, were united parabiotically. One of the subject animals were castrated on the same day, and the treatment with the medicine was started on the day after the parabiotic union for a period of 10 days. The animals were sacrificed on the 11th day after the parabiotic union. The genital organs were removed and weighed.

In this experiment, the castrated rats received orally a dose of 5, 10, 25, 50 and 75γ per day for a period of 10 days of racemic 17α-ethynyl-8α-H-Δ$^{5(10)}$-estrene-17β-ol-3-one admixed with olive oil containing 5% benzyl alcohol.

The experiment included control animals united in parabiotic union: a castrated animal united in parabiotic union with a whole animal, receiving only the solvent.

The test was conducted in comparison with nor-ethynodrel (17α-ethynyl-Δ$^{5(10)}$-estrene-17β-ol-3-one) administered under the same conditions at daily doses of 5, 10, 20 and 40γ.

The results have been summarized in the following table.

The weight of the ovaries of the animals at the time of castration was in the neighborhood of 20 mg. The average weight of the ovaries of the receiver animals allows one to estimate the degree of inhibition of the hypophysial excess. The inhibition was the more complete in the same proportion as the increase in the weights of the ovaries of the receiver animals was the least in comparison with the weight of the ovaries of the animals at the time of their castration.

The dose, which diminished the rate of fertility from 80% to 100%, was 0.2 mg. administered daily for 3 days for levorotatory 17α-ethynyl-8α-H-Δ$^{5(10)}$-estrene-17β-ol-3-one (in dioxane), and 1 mg. administered daily for 3 days for norethynodrel.

The product under study was, consequently, five times more active in regard to the transportation and fixation of the fertilized ovum than norethynodrel.

(B) Anti-ovulatory action: The anti-ovulatory activity was determined according to the technique employed by Velardo (Annuals of the New York Academy of Science, 71, 542).

Some female rats aged about 3 months, previously treated for a period of 7 days and thereafter coupled, were separated from the male animals after coitus had taken place (ascertained by the presence of spermatozoids in the vaginal smears). The animals were sacrificed 8 days after coitus.

Levorotatory 17α-ethynyl-8α-H-Δ$^{5(10)}$-estrene-17β-ol-3-one (in dioxane) and norethynodrel were administered orally.

The daily dose, which lessened the rate of fertility from 80% to 100%, was 1 mg. for a period of 7 days for levorotatory 17α-ethynyl-8α-H-Δ$^{5(10)}$-estrene-17β-ol-3-one (in dioxane), and 2 mg. for a period of 7 days for norethynodrel.

Levorotatory 17α-ethynyl-8α-H-Δ$^{5(10)}$-estrene-17β-ol-3-one (in dioxane) was, therefore, twice as active as norethynodrel based on this test.

The preceding specific embodiments are illustrative of the invention. It is to be understood, however, that other expedients known to those skilled in the art may be employed without departing from the spirit of the invention or the scope of the appended claims.

TABLE

| Groups | Daily doses in γ | Castrated rat donor ||| Intact rat receiver ||||
|---|---|---|---|---|---|---|---|---|
| | | Body weights in gm. || Uterus, mg. | Body weights in gm. || Ovaries, mg. | Uterus, mg. |
| | | Original | Final | | Original | Final | | |
| Control animals | 0 | 74 | 91 | 34.64 | 68 | 89 | 182.06 | 189.96 |
|  | 0 | 76 | 93 | 41.22 | 74 | 106 | 157.64 | 185.08 |
| Norethynodrel | 40 | 66 | 67 | 90.60 | 66 | 77 | 21.56 | 75.84 |
|  | 20 | 79 | 80 | 92.47 | 77 | 77 | 23.52 | 100.15 |
|  | 10 | 73 | 51 | 62.43 | 69 | 94 | 95.75 | 155.76 |
|  | 5 | 73 | 96 | 44.84 | 71 | 94 | 143.80 | 150.70 |
| Racemic 17α-ethynyl-8α-H-Δ$^{5(10)}$-estrene-17β-ol-3-one | 75 | 72 | 97 | 134.66 | 70 | 86 | 29.38 | 115.28 |
|  | 50 | 75 | 78 | 124.70 | 71 | 87 | 34.05 | 111.60 |
|  | 25 | 73 | 78 | 117.91 | 70 | 86 | 28.08 | 86.70 |
|  | 10 | 74 | 82 | 97.65 | 73 | 84 | 27.38 | 92.82 |
|  | 5 | 76 | 89 | 108.50 | 74 | 83 | 49.00 | 118.56 |

It can be ascertained from these data that with obviously equal estrogenic activity (increase of the weight of the uterus of the castrated partner), 17α-ethynyl-8α-H-Δ$^{5(10)}$-estrene-17β-ol-3-one is as active as a dose of 10γ as norethynodrel at a dose of 20γ as hypophysial inhibitor. Racemic 17α-ethynyl-8α-H-Δ$^{5(10)}$-estrene-17β-ol-3-one is, therefore, twice as active as norethynodrel.

(2) Antifertilizing activity in the rat (A) Action on the implantation of fertilized ova: The test described by Pincus and Banik in Proc. Soc. Exp. Biol. Med. 1962, 111, 595, was employed.

Some rats were treated from the first day of gestation (verified by the finding of spermatozoids in vaginal smears) until the third day with increasing doses of levorotatory 17α-ethynyl-8α-H-Δ$^{5(10)}$-estrene-17β-ol-3-one (in dioxane). On the 10th day the animals were sacrificed and the points of implantation were counted. The levorotatory 17α-ethynyl-8α-H-Δ$^{5(10)}$-estrene-17β-ol-3-one (in dioxane) and norethynodrel were daily administered orally at a volume of 1 cc. per animal.

We claim:

1. A method of curbing excessive hypophysial activity in warm-blooded animals which comprises administering to warm-blooded animals from about 0.04 mg./kg. to about 6.0 mg./kg. per day, based on the body weight of said warm-blooded animals, of a compound selected from the group consisting of the racemic and optically active forms of 17α-ethynyl-8α-H-Δ$^{5(10)}$-estrene-17β-ol-3-one.

2. A method of suppressing ovulation in warm-blooded animals which comprises administering to warm-blooded animals from about 0.04 mg./kg. to about 6.0 mg./kg. per day, based on the body weight of said warm-blooded animals, of a compound selected from the group consisting of the racemic and optically active forms of 17α-ethynyl-8α-H-Δ$^{5(10)}$-estrene-17β-ol-3-one.

3. A method of suppressing fertilization of the ova in warm-blooded animals which comprises administering to warm-blooded animals from about 0.04 mg./kg. to about 10.0 mg./kg. per day, based on the body weight of said warm-blooded animals, of a compound selected from the group consisting of the racemic and optically active forms of 17α-ethynyl-8α-H-Δ$^{5(10)}$-estrene-17β-ol-3-one.

References Cited

UNITED STATES PATENTS

| 3,178,456 | 4/1965 | Wettstein et al. | 260—397.4 |
| 3,248,405 | 4/1966 | Fried et al. | 260—397.4 |
| 3,270,007 | 8/1966 | Alvareg | 260—239.55 |

OTHER REFERENCES

Journal Amer. Chem. Soc. (1959), p. 3120–3124 by Yederic et al.

ELBERT L. ROBERTS, Primary Examiner

U.S. Cl. X.R.

260—239.55, 397.4